H. BAERBALCK.
GEARING.
APPLICATION FILED AUG. 22, 1910.
994,899.
Patented June 13, 1911.
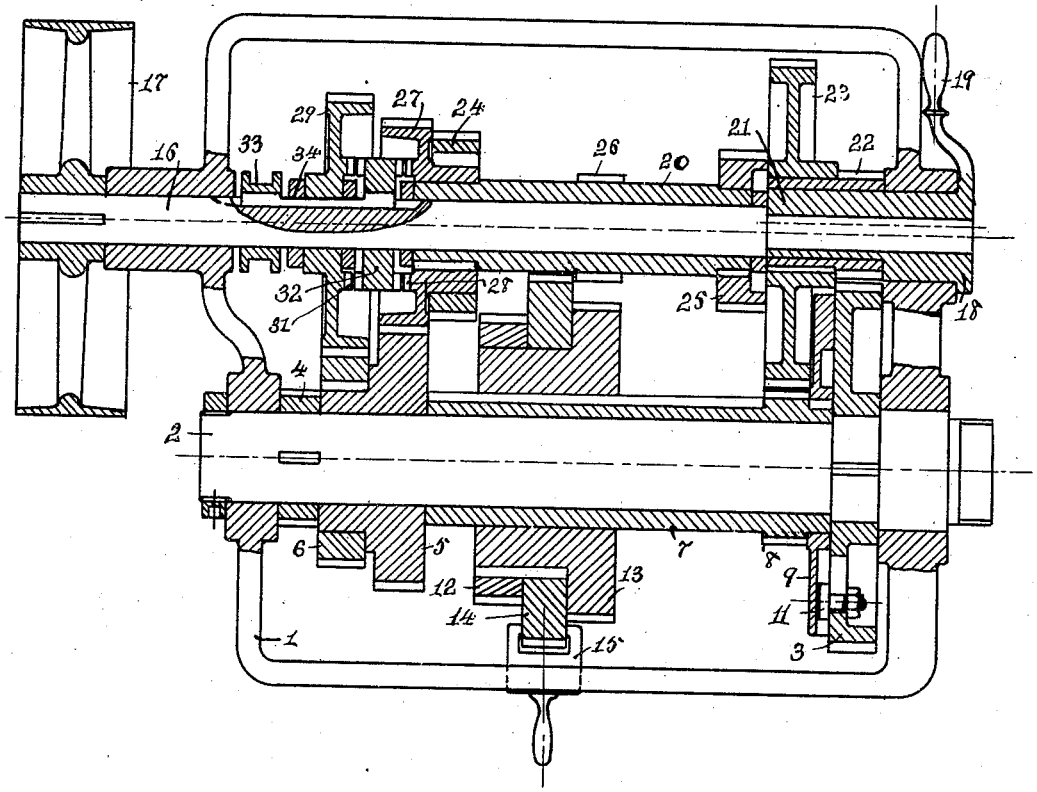

UNITED STATES PATENT OFFICE.

HANS BAERBALCK, OF HAMILTON, OHIO, ASSIGNOR TO THE HAMILTON MACHINE TOOL COMPANY, OF HAMILTON, OHIO, A CORPORATION OF OHIO.

GEARING.

994,899.  Specification of Letters Patent.  Patented June 13, 1911.

Application filed August 22, 1910. Serial No. 578,380.

*To all whom it may concern:*

Be it known that I, HANS BAERBALCK, a citizen of the United States, residing at Hamilton, Ohio, have invented a new and useful Improvement in Gearing, of which the following is a specification.

My invention relates to gearing adapted to the use of engine lathes or for other suitable purposes and the objects of my improvements are to provide means for effecting numerous changes in the relative speeds of two shafts; to provide a plural number of wide changes of speed as bases from which finer graduations of speed may be made, and to provide simple and durable construction and assemblage of the various members for obtaining facility of operation and efficiency of action. These objects are attained in the following described manner as illustrated in the accompanying drawings, in which—

1 represents the head stock of an engine lathe embodying my improvements, 2 the live spindle provided with large and small fast gears 3 and 4 and with large and small idle gears 5 and 6 which are secured together to turn in unison. A sleeve 7 mounted to turn on the spindle between the gears 3 and 5 thereon is provided with a small gear 8 and with a back gear plate 9 adapted to be detachably secured to the spindle gear 3 by means of the sliding bolt 11 in the usual manner. Gears 12, 13, and 14 graduated in size and secured together to turn in unison and splined on sleeve 2 are movable longitudinally thereon by means of the shifter 15 which is slidably mounted in the head 1.

The driving shaft 16 provided with pulley 17 is journaled at one end in the frame 1 and at the other end in sleeve 18 which is rotatively adjustable in said frame by means of a handle 19 thereon. Said sleeve is formed with an eccentric projection 21 whereon the large and small gears 22 and 23 are idly mounted and secured together to turn in unison. The rotative adjustment of sleeve 18 serves to engage or disengage the gears 22 and 23 with the respective gears 3 and 8. A sleeve 20 mounted to turn on shaft 16 is provided with different sized gears 24, 25 and 26 adapted to detachably engage with the respective gears 12, 13 and 14. A gear 27 in continuous engagement with gear 5 is secured on sleeve 20 and formed with a clutch member 28. A gear 29 formed with a clutch member 31 is mounted idly on shaft 16 in continuous engagement with gear 6. A double clutch member 32 splined on shaft 16 is movable into alternate engagement with the clutch members 28 and 31 by means of a yoke lever (not shown) movably engaging with the annular groove in the shifting collar 33 which is secured to the said clutch member by means of the spline or slidable key 34.

In operation, the engagement of the sliding clutch member 32 with the gear 27 turns sleeve 20 in unison with the shaft 16, the engagement of said clutch member with the gear 29 transmits motion through the idle gears 5 and 6 to turn gear 27 with the said sleeve at an accelerated rate of speed. Intermediate graduations between the different speeds of sleeve 20 may be communicated to sleeve 7 by the sliding engagement by means of shifter 15 of either of the gears 12, 13, or 14 with the corresponding gears 24, 25 or 26, and thence to the driven shaft 2 through the engagement of plate 9 with gear 13 on said shaft. The disengagement of plate 9 from gear 13 and the engagement of the intermediate idle gears 22 and 23 with the gears 3 and 8 serves to communicate to spindle 2 and in a different ratio all the foregoing graduations in the speed of sleeve 7. Gear 4 is adapted to drive a train of gears (not shown) to the lead screw.

Having fully described my improvements what I claim as my invention and desire to secure by Letters Patent of the United States is:—

1. A gearing comprising a first and a second shaft, respective idle sleeves thereon, gears on said sleeves, means for alternately engaging corresponding gears on the respective sleeves, a gear on one shaft, a gear on the corresponding sleeve, idle gears journaled eccentric to the other shaft, and means for detachably engaging said gears with the last mentioned shaft and sleeve gears.

2. A gearing comprising a driving shaft, an idle sleeve thereon, a series of gears on said sleeve, an idle gear on said shaft, clutch mechanism for alternately engaging the shaft therewith or with the sleeve, a driven shaft, a stepped gear idly mounted thereon and engaging respectively with said idle gear and one of the gears of the former sleeve, an idle sleeve on the driven shaft, means for detachably engaging the driven shaft therewith and a series of gears splined on the latter sleeve for alternately engaging with corresponding gears on the former sleeve.

3. A gearing comprising a first and a second shaft, respective idle sleeves thereon, detachable change speed gear connections between the sleeves, and respective detachable change speed gear connections between the shafts and the corresponding sleeves.

4. A gearing comprising a driving and a driven shaft, respective idle sleeves thereon, a gear on each of said shafts, respective means for detachably engaging the corresponding shafts with the sleeves, a gear secured on each of said sleeves, and a pair of gears secured together and idly mounted on each of said shafts, the gears of each pair engaging respectively with the corresponding gears on the other shaft and sleeve thereon.

5. A gearing comprising two shafts rotatable in respective opposite directions, respective idle sleeves thereon, detachable change speed gear connections between the sleeves for turning them in the direction of their corresponding shafts, and respective detachable change speed gear connections between the shafts and corresponding sleeves for turning the sleeves in the direction of their corresponding shafts.

HANS BAERBALCK.

Witnesses:
 HORACE C. SHANK,
 R. S. CARR.

---

Copies of this patent may be obtained for five cents each, by addressing the "Commissioner of Patents, Washington, D. C."